(12) United States Patent
Zhu et al.

(10) Patent No.: US 8,821,743 B2
(45) Date of Patent: Sep. 2, 2014

(54) MANUFACTURING METHOD OF GRATING

(71) Applicants: Zhen-Dong Zhu, Beijing (CN); Qun-Qing Li, Beijing (CN); Li-Hui Zhang, Beijing (CN); Mo Chen, Beijing (CN); Shou-Shan Fan, Beijing (CN)

(72) Inventors: Zhen-Dong Zhu, Beijing (CN); Qun-Qing Li, Beijing (CN); Li-Hui Zhang, Beijing (CN); Mo Chen, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/658,043

(22) Filed: Oct. 23, 2012

(65) Prior Publication Data

US 2013/0105439 A1    May 2, 2013

(30) Foreign Application Priority Data

Oct. 28, 2011  (CN) .......................... 2011 1 0333556

(51) Int. Cl.
  *C03C 15/00*  (2006.01)
(52) U.S. Cl.
  CPC .................................... *C03C 15/00* (2013.01)
  USPC .................. 216/69; 216/58; 216/24; 216/67; 438/710; 438/714
(58) Field of Classification Search
  CPC ....... G02B 5/1857; G02B 5/18; G02B 5/1847
  USPC .............. 148/241; 216/24, 41, 64, 67, 79; 257/288; 359/21.2, 568, 569, 580, 850; 385/129; 430/320, 321, 5; 438/689, 438/694, 710, 712, 714, 717, 719, 736; 506/9
  See application file for complete search history.

(56) References Cited

U.S. PATENT DOCUMENTS

| | | | | |
|---|---|---|---|---|
| 4,609,428 | A * | 9/1986 | Fujimura | ........................ 438/728 |
| 5,082,517 | A * | 1/1992 | Moslehi | .................... 156/345.26 |
| 6,699,795 | B1 * | 3/2004 | Schwarz et al. | ............... 438/717 |
| 7,771,895 | B2 | 8/2010 | Wu et al. | |
| 2005/0014385 | A1 * | 1/2005 | Ghozeil et al. | ................ 438/758 |
| 2008/0037101 | A1 | 2/2008 | Jagannathan et al. | |
| 2010/0028572 | A1 | 2/2010 | Kobayashi et al. | |
| 2010/0151207 | A1 | 6/2010 | Hansen et al. | |
| 2011/0111599 | A1 | 5/2011 | Lennon et al. | |

FOREIGN PATENT DOCUMENTS

| | | |
|---|---|---|
| CN | 101160219 | 4/2008 |
| CN | 101187711 | 5/2008 |

(Continued)

OTHER PUBLICATIONS

Laermer et al., Deep Reactive Ion Etching, chapter 23 of Handbook of Silicon Based MEMS Materials and Technologies, 2010, Elsevier Inc., pp. 349-374.*

*Primary Examiner* — Duy Deo
*Assistant Examiner* — Erin Bergner
(74) *Attorney, Agent, or Firm* — Novak Druce Connolly Bove + Quigg LLP

(57) ABSTRACT

The disclosure relates to a method for making a grating. The method includes the following steps. First, a substrate is provided. Second, a patterned mask layer is formed on a surface of the substrate. Third, the substrate with the patterned mask layer is placed in a microwave plasma system. Fourth, a plurality of etching gases are guided into the microwave plasma system simultaneously to etch the substrate through three stages. The etching gas includes carbon tetrafluoride ($CF_4$), argon ($Ar_2$), and sulfur hexafluoride ($SF_6$). Finally, the patterned mask layer is removed.

13 Claims, 7 Drawing Sheets

— The volume flow is in the range of 40sccm and 120sccm
- - - - The volume flow is less than 40sccm
—·—·— The volume flow is greater than 120sccm

(56) References Cited

FOREIGN PATENT DOCUMENTS

| | | |
|---|---|---|
| CN | 102201512 | 9/2011 |
| EP | 1362682 | 11/2003 |
| TW | 200405850 | 4/2004 |
| TW | I294046 | 3/2008 |
| TW | 200823994 | 6/2008 |
| TW | 200829720 | 7/2008 |
| TW | 200947555 | 11/2009 |
| TW | 201007221 | 2/2010 |

* cited by examiner

——————— The volume flow is in the range of 40sccm and 120sccm

– – – – – – – The volume flow is less than 40sccm

—  ·  —  ·  — The volume flow is greater than 120sccm

MANUFACTURING METHOD OF GRATING

BACKGROUND

1. Technical Field

The disclosure relates to a manufacturing method of a grating.

2. Description of Related Art

A sub-wavelength grating is a common optical component in the semiconductor industry. The size of the sub-wavelength grating is similar to or less than the active wavelength of the sub-wavelength grating. It is difficult to make a quartz grating with high density, sub-wavelength, and mark-space ratio. The sub-wavelength grating may be made by electron beam lithography, focused ion beam lithography, deep-ultraviolet lithography, holographic lithography, and nano-imprint lithography.

In the prior art, the aspect ratio of the sub-wavelength grating is 1:1 so as to limit the application field.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
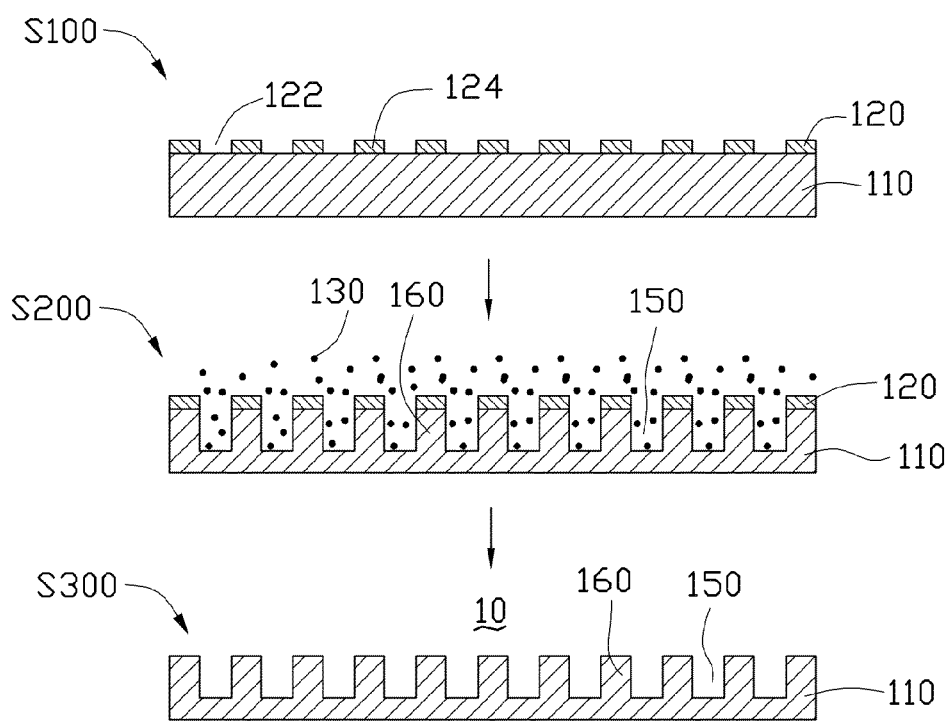
FIG. 1 is a schematic diagram showing one embodiment of a manufacturing method of a grating.
Figure 2:
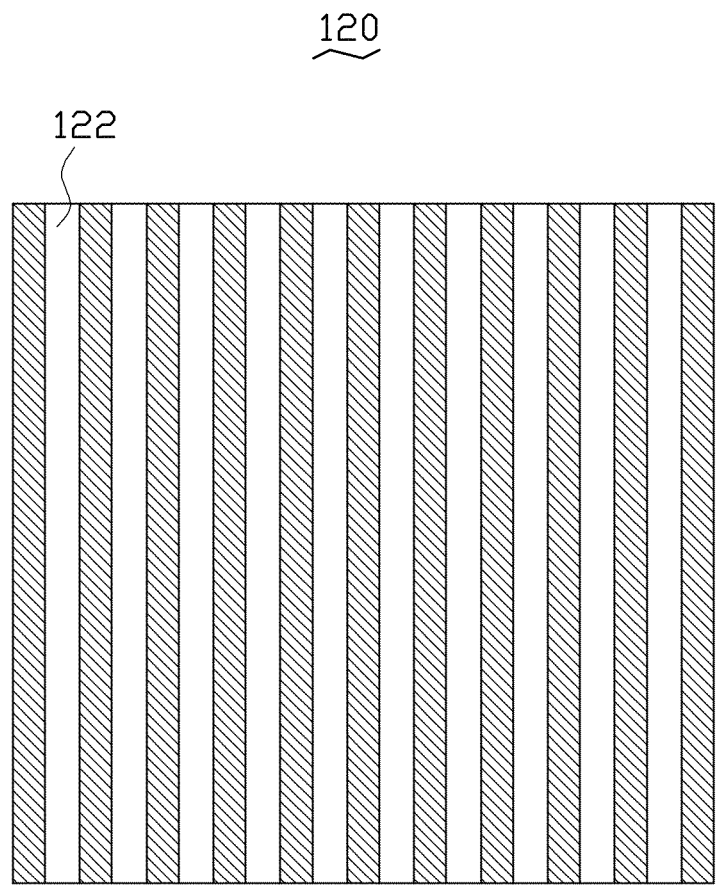
FIG. 2 is a top-view of a patterned mask layer used in the method of FIG. 1.

Referring to FIG. 1, one embodiment of a manufacturing method of a grating 10 includes the following steps. The grating 10 can be a sub-wavelength grating.

In step S100, a substrate 110 is provided, and a patterned mask layer 120 is formed on a surface of the substrate 110.

The substrate 110 can be a circular plate, a square plate, or any other shape plate. The substrate 110 may be a semiconductor substrate or a silicon substrate. The material of the substrate 110 may be gallium nitride (GaN), gallium arsenide (GaAs), sapphire, aluminum oxide, magnesium oxide, silicon, silica, silicon nitride, or silicon carbide, wherein the silica may form a quartz substrate or a glass substrate. In one embodiment, the substrate 110 is a quartz substrate. In addition, the material of the substrate 110 also may be a P-type semiconductor or an N-type semiconductor, e.g. a P-type GaN or N-type GaN. Furthermore, the size, the thickness, and the shape of the substrate can be set as desired.

In addition, the patterned mask layer 120, which is made by a photoresist film, has a plurality of mask strips 124 and a plurality of first nanometer scale cavities 122 arranged in intervals. A part of the surface of the substrate 110 is exposed to the patterned mask layer 120 through the first cavities 122.

The nano-pattern of the patterned mask layer 120 can be a continuous pattern or a discontinuous pattern. In one embodiment, the material of the patterned mask layer 120 is chromium, the mask strips 124 and the first cavities 122 are arranged with regular intervals, the width of each first cavity 122 is about 100 nm, and the depth of each cavity 122 is about 40 nm.

In step S200, the substrate 110 with the patterned mask layer 120 is placed in a microwave plasma system (not shown), and a plurality of etching gases 130 is guided into the microwave plasma system to etch the substrate 110 exposed to the patterned mask layer 120. In one embodiment, the etching gases 130 comprise carbon tetrafluoride ($CF_4$), argon ($Ar_2$), and sulfur hexafluoride ($SF_6$). The etching process includes three stages.

In a first etching stage, $CF_4$ and $Ar_2$ are guided into the microwave plasma system simultaneously. The flow volume of $CF_4$ and $Ar_2$ is in the range of about 40 sccm to about 120 sccm, the flow volume of $CF_4$ is in the range of about 10 sccm to about 100 sccm, and the flow volume of $Ar_2$ is in the range of about 1 sccm to about 30 sccm.

In a second etching stage, $CF_4$, $Ar_2$, and $SF_6$ are guided into the microwave plasma system simultaneously. The flow volume of $CF_4$, $Ar_2$, and $SF_6$ is in the range of about 40 sccm to about 120 sccm. The flow volume of $SF_6$ is greater than the flow volume of $CF_4$.

In a third etching stage, $CF_4$, $Ar_2$, and $SF_6$ are guided into the microwave plasma system. The flow volume of $CF_4$ is greater than the flow volume of $SF_6$. The flow volume of $CF_4$ is in the range of about 20 sccm to about 80 sccm, the flow volume of $SF_6$ is in the range of about 5 sccm to about 50 sccm, and the flow volume of $Ar_2$ is in the range of about 5 sccm to about 40 sccm.

In step S300, the patterned mask layer 120 is removed to obtain a grating 10 having a high aspect-ratio. In one embodiment, the high aspect-ratio is equal to or greater than about 6:1.

Figure 3:
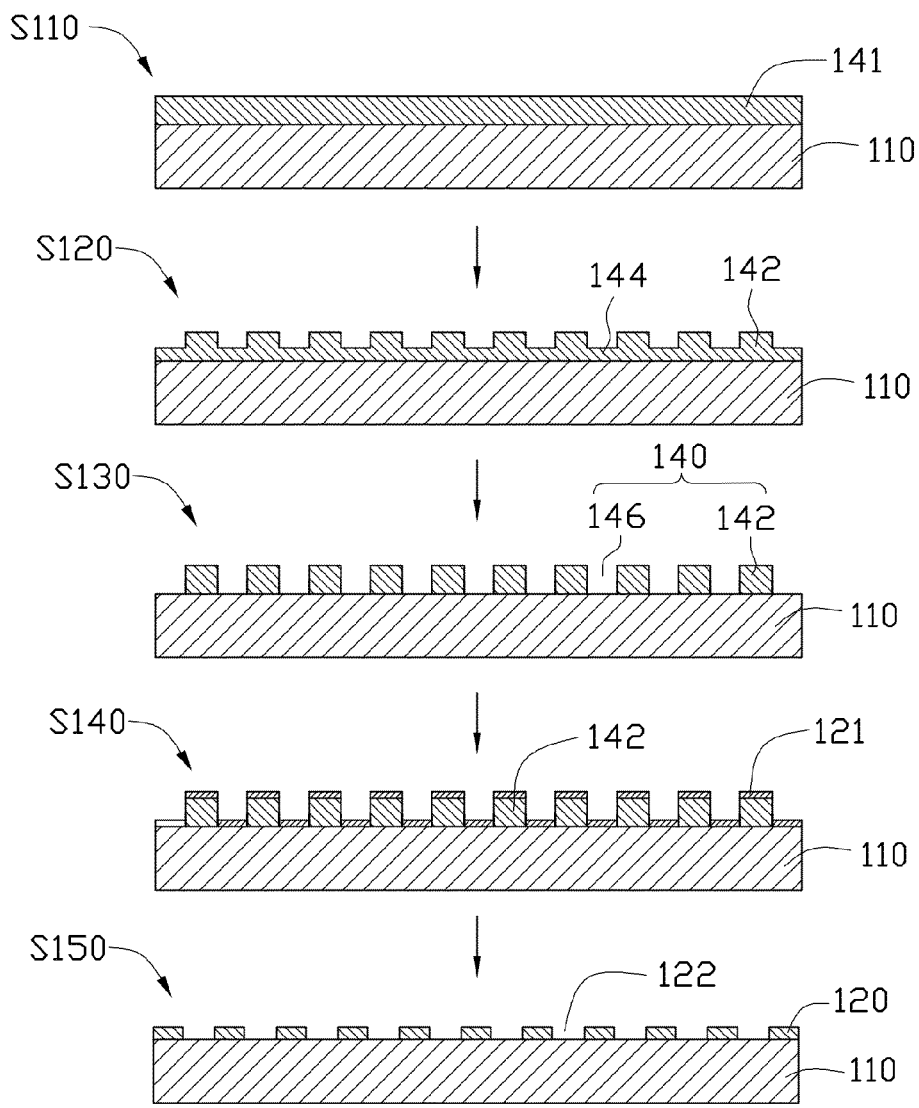
FIG. 3 is a schematic diagram showing one embodiment of a detail manufacturing method of a grating.

Referring to FIG. 3, the method for making the patterned mask layer 120 on the substrate 110 includes the following steps.

In step S110, a photoresist film 141 is disposed on the surface of the substrate 110. The photoresist film 141 for protecting the substrate 110 can be a single layer or multi-layer film. The material of the single layer may be ZEP520A, hydrogen silsesquioxane (HSQ), Polymethylmethacrylate (PMMA), Polystyrene (PS), AR-N series, AR-Z series, AR-B series, SAL-601, or organic silicon oligomer. In one embodiment, the photoresist film 141 is a two layer structure. The material of one layer of the photoresist film 141 is PMMA and the other layer is hydrogen silsesquioxane (HSQ), wherein the PMMA layer is disposed adjacent to the substrate 110.

Step S110 can further include the steps S112 to S118.

In step S112, the substrate 110 is cleaned according to cleanroom standards.

In step S114, the PMMA layer is formed on the surface of the substrate 110 by spin coating. The thickness of the PMMA layer is in the range of about 100 nm to about 500 nm.

In step S116, a transitional layer is formed to cover the PMMA layer by sputtering or depositing. In one embodiment, the material of the transitional layer is silica, which is deposited on the PMMA layer. The thickness of the transitional layer is in the range of about 10 nm to about 100 nm.

In step S118, the HSQ layer is formed to cover on the transitional layer by bead coating or spin coating. In one embodiment, the HSQ layer is formed on the transitional layer by spin coating with high pressure. The thickness of the HSQ layer is in the range of about 100 nm to about 500 nm, and preferably in the range of about 100 nm to about 300 nm.

In step S120, a nano-pattern is formed on the photoresist film 141 by nano-imprint lithography. A plurality of protrusions 142 and a plurality of cavities 144 are formed on the photoresist film 141. Step S120 can further include the steps S122 to S126.

In step S122, a mold with a nano-pattern is provided, wherein the nano-pattern is disposed on a surface of the mold. The nano-pattern includes a plurality of protrusions and a plurality of cavities. Each cavity is defined between two protrusions. In one embodiment, the mold is a transparent material, which may be made of silica, quartz, or diboride glass.

In step S124, the surface with the nano-pattern of the mold is attached to the HSQ layer of the photoresist film 141, and a force is provided to map the nano-pattern from the mold to the photoresist film 141 under normal atmospheric temperature. In one embodiment, the nano-pattern is only formed at the HSQ layer, and the PMMA is intact.

In step S126, the mold is removed from the substrate 110 so as to form the protrusions 142 and the cavities 144 on the photoresist film 141. The protrusions 142 correspond to the cavities of the mold, and the cavities 144 correspond to the protrusions of the mold.

In step S130, the photoresist film 141 located at the cavities 144 are removed to form a patterned photoresist layer 140 with a plurality of second cavities 146. A part of the surface of the substrate 110 is exposed to the patterned photoresist layer 140 through the second cavity 146. Step S130 can further include steps S132 and S134.

In step S132, the substrate 110 is placed in a microwave plasma system, and a reaction gas $CF_4$ is guided into the microwave plasma system to remove the HSQ layer located at the cavities 144. The microwave plasma system is operated in reaction-ion-etching (RIE) mode. During the RIE mode, an induced power source generates $CF_4$ plasma, wherein the $CF_4$ plasma with low ion energy is diffused from the generation area to the surface of the substrate 110 to etch the HSQ layer located at the cavities 144. During the process, the power of the microwave plasma system is about 40 watts (W), the volume flow of the $CF_4$ plasma is about 26 sccm, the pressure in the microwave plasma system is about 2 pascals (Pa), and the etching time is about 10 seconds. The HSQ layer located at the cavities 144 is removed and a part of the PMMA layer is exposed after the above process. The thickness of the HSQ layer located at the protrusions is reduced after the step S132.

In step S134, a reaction gas $O_2$ is guided into the microwave plasma system to remove the PMMA layer located at the cavities 144 to form a plurality of second cavities 146 to expose a part of the surface of substrate 110. During the process, the power of the microwave plasma system is about 40 W, the volume flow of the $O_2$ plasma is about 40 sccm, the pressure in the microwave plasma system is about 2 Pa, and the etching time is about 120 seconds. The HSQ layer can be a mask during the process of removing the PMMA layer to increase etching precision. In one embodiment, the depth of one of the second cavities 146 is in the range of about 100 nm to about 500 nm and the width of one of the second cavities 146 is in the range of about 25 nm to about 150 nm.

In step S140, a mask layer 121 is deposited on the patterned photoresist layer 140 and the surface of the substrate 110 exposed to the patterned photoresist layer 140. A mask layer 121 is formed on the patterned photoresist layer 140 and the surface of the substrate 110 exposed to the second cavities 146. The material of the mask layer 121 can be chromium, and the thickness of the mask layer 121 is about 40 nm.

In step S150, the patterned photoresist layer 140 and the mask layer 121 on the protrusions are removed to form a patterned mask layer 120. The patterned photoresist layer 140 can be removed by Tetrahydrofuran (THF), acetone, methyl ethyl ketone, cyclohexane, n-hexane, methyl alcohol, or ethyl alcohol. The mask layer 121 covered on the patterned photoresist layer 140 is also removed with the patterned photoresist layer 140 to form the patterned mask layer 120. The patterned mask layer 120 is formed on the surface of the substrate. In one embodiment, the patterned photoresist layer 140 and the mask layer 121 thereon is removed by ultrasonic cleaner and acetone.

Another method for making the patterned mask layer includes the steps of forming a chromium layer on the surface of the substrate 110, forming a photoresist on a surface of the chromium layer, patterning the photoresist by photolithography to expose a part of the chromium layer, removing the chromium layer exposed to the photoresist by electron beam bombardment, and removing the photoresist to form a patterned chromium layer. The patterned chromium layer can be the patterned masked layer.

The mark-space ratio of the patterned mask layer 120 is 1:1, and the width of the first cavity 122 is in the range of about 25 nm and about 150 nm.

In step S200, the microwave plasma system is operated under RIE mode. The etching gases include $CF_4$, $SF_6$, and $Ar_2$, which are generated by an induced power source of the microwave plasma system. The etching gases etch the exposed surface of the substrate 110 to form a plurality of stripped cavities 150. The etching gases further etch each of the cavities 150 along a vertical direction and a horizontal direction, which are defined as vertical etching and horizontal etching, respectively.

In the first etching stage, the $CF_4$ and $Ar_2$ etching gases are guided into the microwave plasma system simultaneously to etch the exposed surface of the substrate 110 to form the cavities 150 having a first depth. In one embodiment, the vertical etching rate is greater than the horizontal etching rate of $CF_4$ plasma. The horizontal etching rate of $CF_4$ plasma is about 1 nm/min and the vertical etching rate of $CF_4$ plasma is about 26 nm/min to about 36 nm/min.

During the etching process, the $CF_4$ etching gas easily reacts with the substrate 110 to produce silicon fluoride compounds. The silicon fluoride compounds can easily adhere to the exposed surface of the substrate 110 to block the substrate 110 etched by the etching gas of $CF_4$. However, the bombardment of the $Ar_2$ etching gas can decompose the silicon fluoride compounds so that the $CF_4$ etching gas can etch the substrate 110 again. Furthermore, the produced rate of the silicon fluoride compounds produced on the sidewall is greater than the etching rate of the silicon fluoride compounds etched on the sidewall so that the horizontal etching rate is slower than the vertical etching rate. The silicon fluoride compounds produced on the sidewall keeps the sidewall of the cavities 150 steep.

After the first etching stage, there is a protrusion 160 formed between two cavities 150. In one embodiment, the width of the cavity 150 is about 100 nm and the width of the protrusion 160 is about 100 nm so that the mark-space rate is about 1:1.

In the first etching stage, the flow volume of the etching gases is in the range of about 40 sccm to about 120 sccm. The flow volume of $CF_4$ is in the range of about 10 sccm to about 100 sccm. The flow volume of $Ar_2$ is in the range of about 1 sccm to about 30 sccm. A pressure of the etching gases is in the range of about 1 Pa to about 5 Pa. An etching power of the microwave plasma system is in the range of about 40 W to about 200 W. In addition, the width of the cavity 150 is in the range of about 25 nm to about 150 nm and the depth of the cavity 150 is in the range of about 20 nm to about 80 nm after the first etching stage. In one embodiment, the etching time of the first etching stage is in the range of about 2 minutes to about 3 minutes, the flow volume of $CF_4$ is about 40 sccm and the flow volume of $Ar_2$ is about 10 sccm, the pressure of the etching gases is about 2 Pa, the etching power of the microwave plasma system is about 70 W, the width and the depth of the cavity 150 is in the range of about 40 nm to about 100 nm, respectively.

In one embodiment, the mark-space ratio of the grating 10 is defined in the first etching stage by the $CF_4$ and $Ar_2$ etching gases.

In the second etching stage, the etching gases can further include $SF_6$, and $CF_4$ etching gases, which are guided into the microwave plasma system simultaneously.

During the etching process, the $CF_4$ and $SF_6$ etching gases can easily react with the substrate 110 to produce the silicon fluoride compounds. However, the bombardment of the $Ar_2$ etching gas can decompose the silicon fluoride compounds so that the $CF_4$ and $SF_6$ etching gases can etch the substrate 110 again.

In the second etching stage, the flow volume of the etching gases is in the range of about 40 sccm to about 120 sccm, wherein the flow volume of $CF_4$ is in the range of about 1 sccm to about 50 sccm, the flow volume of $SF_6$ is in the range of about 10 sccm to about 70 sccm, and the flow volume of $Ar_2$ is in the range of about 10 sccm to about 20 sccm. In one embodiment, the flow volume of the etching gas is about 78 sccm, the flow volume of $CF_4$ is about 20 sccm, the flow volume of $SF_6$ is about 48 sccm, and the flow volume of $Ar_2$ is about 10 sccm.

In one embodiment, the $SF_6$ etching gas is for vertical etching so that each of the cavities has the second depth, which is greater than the first depth. The flow volume of $SF_6$ is in the range of about 10 sccm to about 70 sccm, the horizontal etching rate of $SF_6$ is in the range of about 7 nm/min to about 8 nm/min, and the vertical etching rate of $SF_6$ is in the range of about 60 nm/min to about 70 nm/min.

In the etching process, not only the silicon fluoride compounds are bombarded by $Ar_2$ but also patterned mask layer 120. The patterned mask layer 120 is out of shape in the long etching time to reduce the etching precision due to the patterned mask layer 120 may be etched by the $Ar_2$ etching gas. In the second etching stage, the flow volume of $SF_6$ is greater than the flow volume of $CF_4$ to process the vertical etching so that the etching time can be saved to maintain the process precision and to obtain the cavity 150 with the mark-space ratio greater than about 6:1.

The etching gas can further include $O_2$, and the flow volume of $O_2$ is in the range of greater than 0 sccm to about 10 sccm. The $CF_4$, $SF_6$, $Ar_2$, and $O_2$ etching gases are guided into the microwave plasma system simultaneously to assist the burning of the silicon fluoride compounds. In addition, the reaction between the substrate 110 and $O_2$ produces a chemical compound having silicon-oxygen bond and silicon-carbon bond, which is burned by $Ar_2$ to speed up the etching time. In one embodiment, $O_2$ is guided into the microwave plasma system when the total flow volume of $CF_4$ and $SF_6$ is greater than about 60 sccm.

Figure 4:
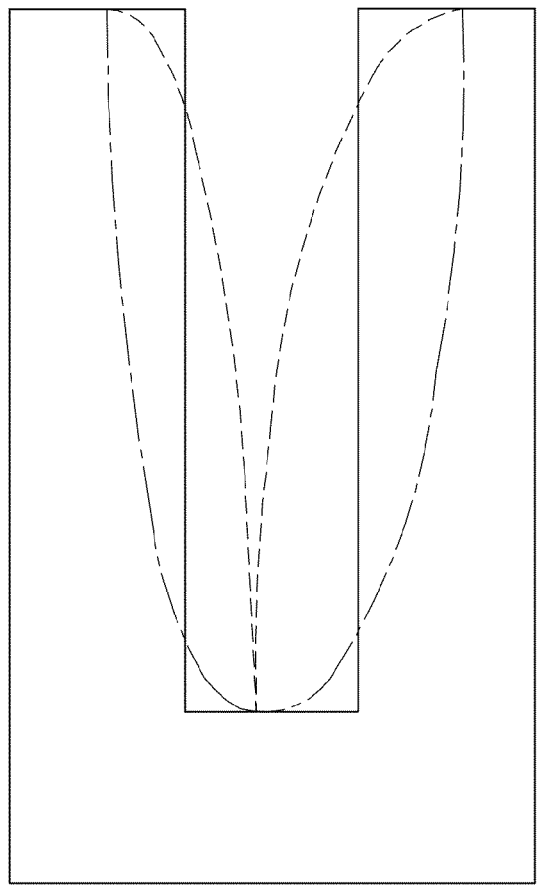
FIG. 4 is a cross-sectional diagram of one cavity of the grating of FIG. 1.

Referring to FIG. 4, in the second etching stage, the different flow volume of the etching gas produces different shape of the cavities. The cross-section of the cavity is V-shaped if the flow volume of the etching gas is less than about 40 sccm. The cross-section of the cavity is U-shaped if the flow volume of the etching gas is greater than about 120 sccm. The wall of the cavity is about perpendicular to the surface of the substrate 110 when the flow volume of the etching gas is in the range of about 40 sccm to about 120 sccm.

In addition, an etching time is in the range of about 2 minutes and about 4 minutes, a pressure of the etching gas is in the range of about 1 Pa to about 5 Pa, and an etching power is in the range of about 40 W to about 200 W in the second etching stage. In one embodiment, the etching time is about 2 minutes, the pressure of the etching gas is about 2 Pa, and the etching power is about 40 W. Under the above condition, the depth of the cavity 150 is in the range of about 620 nm to about 650 nm when the end of the second etching stage. In one embodiment, the depth of the cavity 150 is about 620 nm.

The second etching stage of the present disclosure has many advantages. The silicon fluoride compounds can be bombarded by $Ar_2$ to continue the etching process to obtain the grating 10 with a high aspect ratio greater than or equal to about 6:1. The flow volume of the etching gas is controlled in the range of about 40 sccm and about 120 sccm to ensure the wall of the cavities 150 of the substrate 110 is substantially perpendicular. The width and the depth of the cavities of the substrate 110 can be controlled under a particular condition. One condition includes the $CF_4$, $SF_6$, and $Ar_2$ etching gas flowing in the range of about 40 sccm to about 120 sccm, the pressure of the etching gas is in the range of about 1 Pa to about 5 Pa, and the etching power of the microwave plasma system is in the range of about 40 W to about 200 W. The depth of the cavity 150 can be increased if the flow volume of $SF_6$ is greater than the flow volume of $CF_4$ so that the aspect ratio of the cavity 150 is greater than or equal to about 6:1.

In the third etching stage, the flow volume of $SF_6$ is in the range of about 5 sccm to about 50 sccm, the flow volume of $CF_4$ is in the range of about 20 sccm to about 80 sccm, the flow volume of $Ar_2$ is in the range of about 5 sccm to about 40 sccm. In one embodiment, the flow volume of $SF_6$ is about 10 sccm, the flow volume of $CF_4$ is about 40 sccm, and the flow volume of $Ar_2$ is about 20 sccm.

In the third etching stage, the flow volume of $SF_6$ is about 10 sccm, which is smaller than the flow volume of $SF_6$ in the second etching stage. In the second etching stage, the flow volume of $SF_6$ is about 40 sccm, the horizontal etching rate is about 8 nm/min, and the vertical etching rate is about 70 nm/min. Compared to the second etching stage, in the third etching stage, the flow volume of $SF_6$ is about 10 sccm, the horizontal etching rate is in the range of about 5 nm/min to about 8 nm/min, and the vertical etching rate is in the range of about 20 nm/min. Therefore, the vertical etching rate is reduced significantly in the third etching stage, and the horizontal etching rate is affected normally.

The horizontal etching rate of $CF_4$ in the third etching stage is about equal to the horizontal etching rate of $CF_4$ in the second etching stage. In addition, in the second etching stage, the flow volume of $CF_4$ is about 20 sccm, and the vertical etching rate is about 30 nm/min. In the third etching stage, the flow volume of $CF_4$ is about 40 sccm, and the vertical etching rate is about 36 nm/min. Therefore, the vertical etching rate of $CF_4$ in the third etching stage is greater than the vertical etching rate of $CF_4$ in the second etching stage. In summary, the function of the third etching stage is to modify the V-shaped or U-shaped sidewall of the cavity 150 by etching the sidewall near the bottom of the cavity 150.

In the third etching stage, the pressure of the etching gas is in the range of about 1 Pa to about 10 Pa. In one embodiment, the pressure of the etching gas is about 2 Pa. The vertical etching rate is slower if the pressure of the gas is greater in the etching process. Therefore, the pressure in the third etching stage is greater than the pressure in the first and second etching stages.

In addition, the etching power of the microwave plasma system is in the range of about 20 W to about 200 W, and the etching time is in the range of about 1 minute to about 2 minutes. In one embodiment, the etching power of the microwave plasma system is about 40 W, and the etching time is about 1 minute. The depth of the cavity 150 is in the range of about 620 nm to about 650 nm after the third etching stage. In one embodiment, the depth of the cavity 150 is about 620 nm.

The step S300 can further include steps S302 and S304 if the material of the patterned mask layer 120 is chromium.

In step S302, a chromium etchant (K3[Fe(CN)6]) is provided, wherein the concentration of the K3[Fe(CN)6] is in the range of about 0.06 mol/L to about 0.25 mol/L.

In step S304, the substrate 110 is dipped in the chromium etchant for about 4 minutes to about 15 minutes to remove the patterned mask layer 120.

Figure 5:
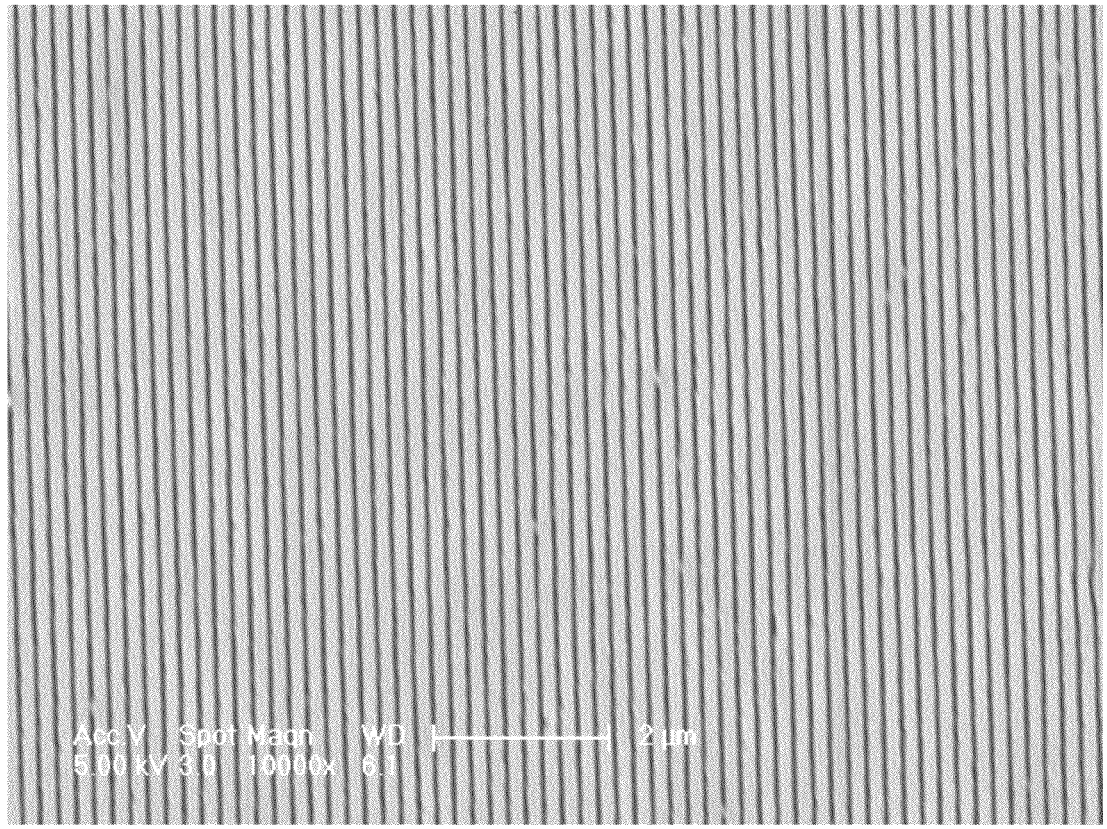
FIGS. 5 to 7 are images of the grating taken by a scanning electron microscope.
Figure 6:
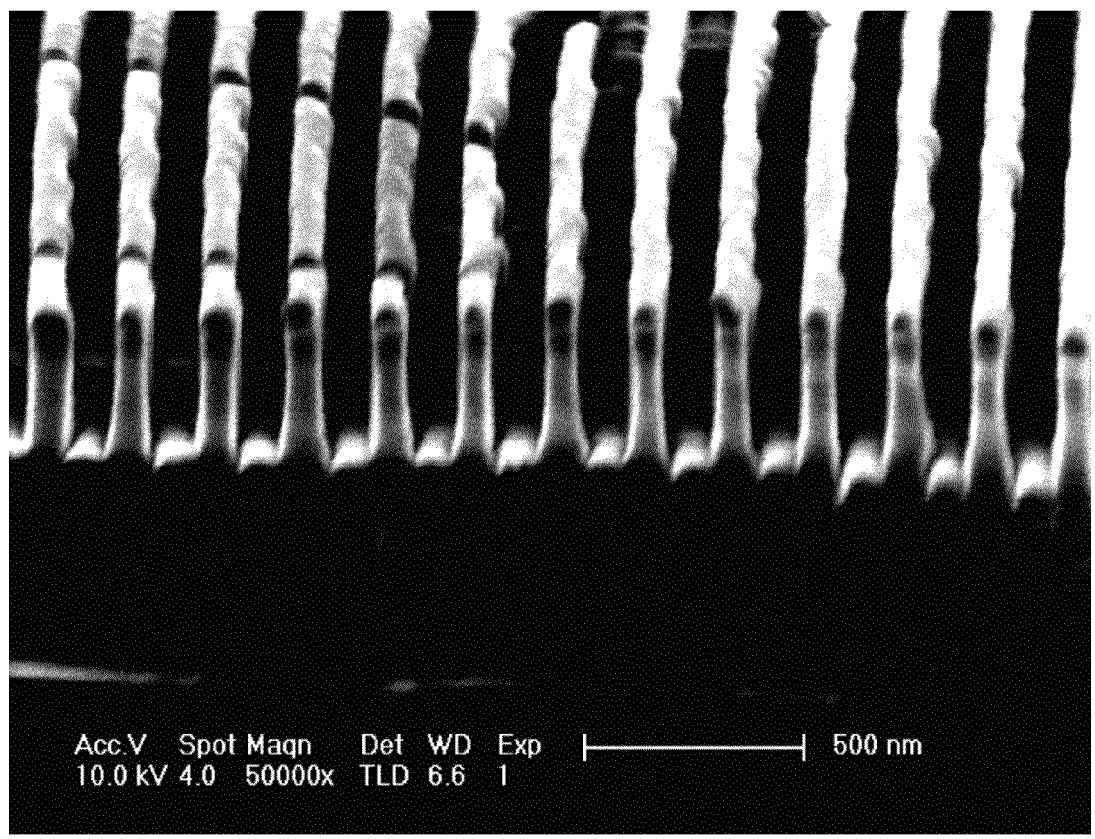
Figure 7:
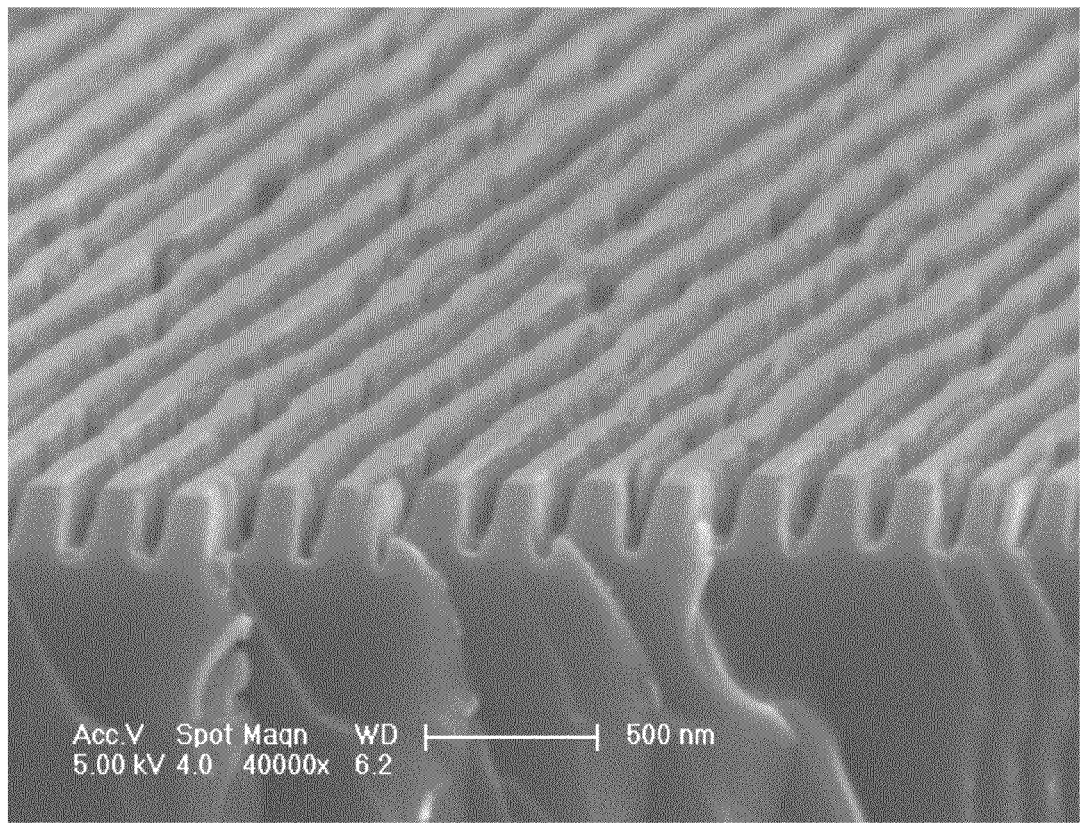

Referring to FIG. 5 and FIG. 6, the sidewalls of the cavities are substantially perpendicular to the surface of the substrate after the third etching stage. Referring to FIG. 7, the sidewalls of the cavities are not perpendicular to the surface of the substrate without the third etching stage.

The present disclosure has many advantages. The mark-space ratio is determined during the first etching stage. The depth of the cavity is increased speedy by the flow volume of $SF_6$ is greater than the flow volume of $CF_4$ in the second etching stage. The sidewalls near the bottom of the cavities are modified if the cross-section of the cavity is V-shaped or U-shaped in the third etching stage. The diffraction of the grating is good if the sidewalls of the cavities are perpendicular to the surface of the substrate.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A manufacturing method of a grating, the method comprising:
   providing a substrate and a plurality of etching gas comprising carbon tetrafluoride ($CF_4$), sulfur hexafluoride ($SF_6$) and argon ($Ar_2$);
   forming a patterned mask layer on a surface of the substrate;
   placing the substrate with the patterned mask layer in a microwave plasma system;
   guiding the plurality of etching gas into the microwave plasma system to etch the substrate so that a plurality of cavities having wall about perpendicular to the surface of the substrate are formed on the substrate, comprising three stages:
      in a first etching stage, the $CF_4$ and $Ar_2$ etching gases are guided into the microwave plasma system simultaneously, wherein the flow volume of $CF_4$ and $Ar_2$ is in the range of 40 sccm to 120 sccm, the flow volume of $CF_4$ is in the range of 10 sccm to 100 sccm, and the flow volume of $Ar_2$ is in the range of 1 sccm to 30 sccm;
      in a second etching stage, the $CF_4$, $Ar_2$, and $SF_6$ etching gases are guided into the microwave plasma system simultaneously, wherein the flow volume of $CF_4$, $Ar_2$, and $SF_6$ is in the range of 40 sccm to 120 sccm, and the flow volume of $SF_6$ is greater than the flow volume of $CF_4$;
      in a third etching stage, the CF4, Ar2, and SF6 etching gases are guided into the microwave plasma system, wherein the flow volume of $CF_4$ is greater than the flow volume of $SF_6$, the flow volume of $CF_4$ is in the range of 20 sccm to 80 sccm, the flow volume of $SF_6$ is in the range of 5 sccm to 50 sccm, and the flow volume of $Ar_2$ is in the range of 5 sccm to 40 sccm; and
   removing the patterned mask layer.

2. The manufacturing method of claim 1, wherein the flow volume of $CF_4$ is about 40 sccm and the flow volume of $Ar_2$ is 10 sccm in the first etching stage.

3. The manufacturing method of claim 1, wherein the flow volume of $CF_4$ is in the range of 1 sccm to 50 sccm, the flow volume of $SF_6$ is in the range of 10 sccm to 70 sccm, the flow volume of $Ar_2$ is in the range of 10 sccm to 20 sccm in the second etching stage.

4. The manufacturing method of claim 3, wherein the flow volume of $CF_4$ is 20 sccm, the flow volume of $SF_6$ is 48 sccm, and the flow volume of $Ar_2$ is 10 sccm in the second etching stage.

5. The manufacturing method of claim 1, wherein the flow volume of $CF_4$ is 40 sccm, the flow volume of $SF_6$ is 20 sccm, and the flow volume of $Ar_2$ is 20 sccm in the third etching stage.

6. The manufacturing method of claim 1, wherein the pressure of the etching gases is in the range of 1 Pa to 5 Pa in the first etching stage, the pressure of the etching gas is in the range of 1 Pa to 5 Pa in the second etching stage, and the pressure of the etching gas is in the range of 1 Pa to 10 Pa in the third etching stage.

7. The manufacturing method of claim 1, wherein the etching power of the microwave plasma system is in the range of 40 watts to 150 watts in the first etching stage, the etching power of the microwave plasma system is in the range of 40 watts to 150 watts in the second etching stage, and the etching power of the microwave plasma system is in the range of 20 watts to 200 watts in the third etching stage.

8. The manufacturing method of claim 1, wherein the etching time in the first etching stage is in the range of 2 minutes to 3 minutes, the etching time in the second etching stage is in the range of 2 minutes to 4 minutes, and the etching time in the third etching stage is in the range of 1 minute to 2 minutes.

9. The manufacturing method of claim 1, wherein the step of forming the patterned mask layer further comprising:
   forming a photoresist film on a surface of the substrate;
   forming a nano-pattern on the photoresist film by nano-imprint lithography;
   etching the photoresist film to form a patterned photoresist layer;
   covering a mask layer on the patterned photoresist layer and the surface of the substrate exposed to the patterned photoresist layer; and
   removing the patterned photoresist layer and the mask layer thereon to form a patterned mask layer.

10. The manufacturing method of claim 1, wherein the patterned mask layer has a plurality of cavities, and the width of each cavity is in the range of 25 nm to 150 nm.

11. A manufacturing method of a grating, the method comprising:
   providing a substrate;
   forming a patterned mask layer on a surface of the substrate;
   placing the substrate with the patterned mask layer in a microwave plasma system;

guiding an etching gas into the microwave plasma system simultaneously to etch the substrate so that a plurality of cavities having wall about perpendicular to the surface of the substrate are formed on the substrate, wherein etching the substrate comprises three stages:

in a first etching stage, carbon tetrafluoride ($CF_4$) and argon ($Ar_2$) are guided into the microwave plasma system simultaneously to form a plurality of cavities having a first depth on the surface of the substrate;

in a second etching stage, $CF_4$, $Ar_2$, and sulfur hexafluoride ($SF_6$) are guided into the microwave plasma system simultaneously to etch the cavities having a second depth on the surface of the substrate, wherein the second depth is greater than the first depth, and the flow volume of $SF_6$ is greater than the flow volume of $CF_4$, wherein the flow volume of $CF_4$ $Ar_2$ and $SF_6$ is in the range of 40 sccm to 120 sccm in the second etching stage;

in a third etching stage, $CF_4$, $Ar_2$, and $SF_6$ are keep guided into the microwave plasma system, wherein the flow volume of $CF_4$ is greater than the flow volume of $SF_6$, and a bottom of the cavities are horizontally etched to obtain the cavities with precipitous sidewall; and removing the patterned mask layer.

12. The manufacturing method of claim 11, wherein in the first etching stage, the flow volume of $CF_4$ and $Ar_2$ is in the range of 40 sccm to 120 sccm, the flow volume of $CF_4$ is in the range of 10 sccm to 100 sccm, and the flow volume of $Ar_2$ is in the range of 1 sccm to 30 sccm in the first etching stage.

13. The manufacturing method of claim 11, wherein in the third etching stage, the flow volume of $CF_4$ is in the range of 20 sccm to 80 sccm, the flow volume of $SF_6$ is in the range of 5 sccm to 50 sccm, and the flow volume of $Ar_2$ is in the range of 5 sccm to 40 sccm in the third etching stage.

* * * * *